H. A. BOSSERT.
DIRIGIBLE HEADLIGHT.
APPLICATION FILED DEC. 11, 1916.
1,243,584.
Patented Oct. 16, 1917.
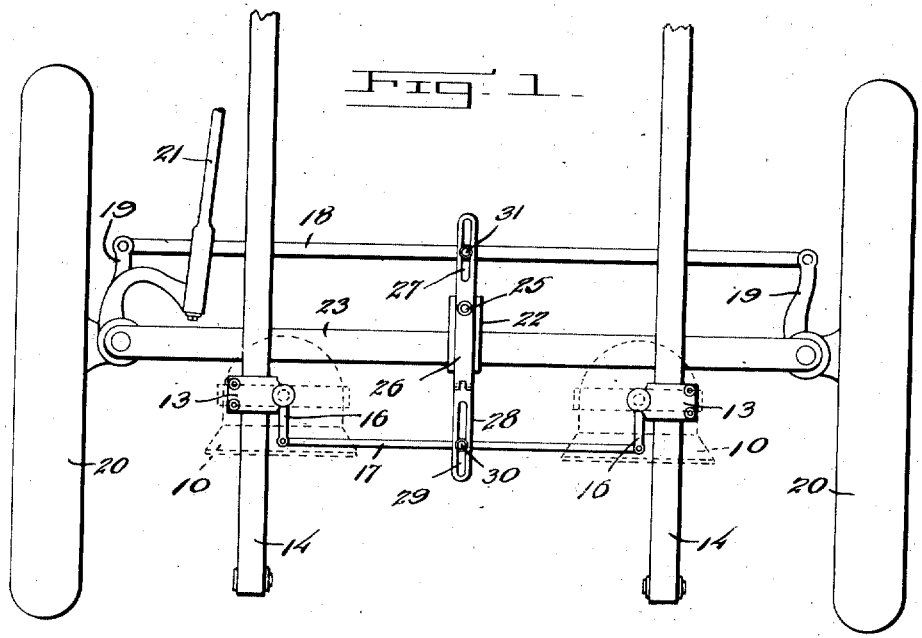
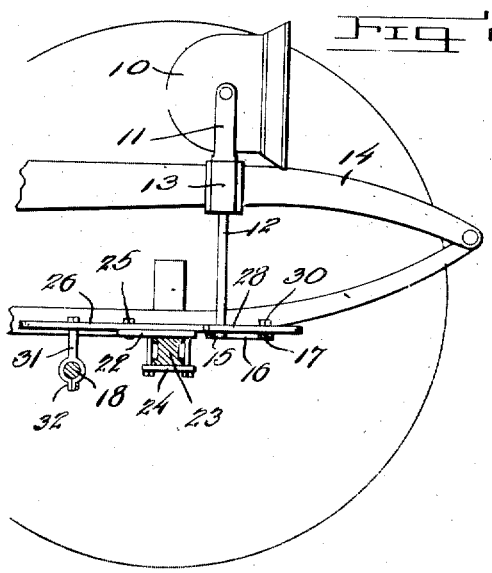
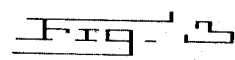
WITNESSES
INVENTOR
Harry A. Bossert,
BY
ATTORNEY

UNITED STATES PATENT OFFICE.

HARRY A. BOSSERT, OF CASSVILLE, WISCONSIN.

DIRIGIBLE HEADLIGHT.

1,243,584.  Specification of Letters Patent.  Patented Oct. 16, 1917.

Application filed December 11, 1916. Serial No. 136,277.

*To all whom it may concern:*

Be it known that I, HARRY A. BOSSERT, a citizen of the United States, residing at Cassville, in the county of Grant and State of Wisconsin, have invented certain new and useful Improvements in Dirigible Headlights, of which the following is a specification.

This invention relates to an improved dirigible headlight for automobiles or other vehicles and the principal object of the invention is to provide improved means for turning the headlight with the steering wheels of the automobile, the actuating means including an improved connection between the cross bar connecting the lever arms of the wheel spindles with the cross bar connecting the lever arms of the lamp bracket standards or shafts.

Another object of the invention is to so construct this connecting bar or turning arm that vibration will be taken up and thus the lamps prevented from being injured when the machine travels over rough places in a road.

Another object of the invention is to provide a structure of the character described which will be comparatively simple in construction and which may be used in connection with automobiles already in use.

This invention is illustrated in the accompanying drawings, wherein:—

Figure 1 is a view in top plan showing the dirigible headlight operating mechanism.

Fig. 2 is a view showing the headlight operating mechanism partially in elevation and partially in section, and, Fig. 3 is a fragmentary perspective view of a portion of the headlight operating mechanism.

The headlights indicated by dotted lines in Fig. 1 and shown in elevation in Fig. 2 and indicated by the numeral 10 are carried by the lamp brackets 11, the stems or standards 12 of which are rotatably mounted in the bearings 13 and extend downwardly to a point adjacent the lower leaf of the springs 14 and have their lower ends engaged by the clamps 15 of the levre armn 16. These lever arms 16 are pivotally connected with the connecting rod 17 and therefore when this rod 17 is moved longitudinally, the lamps will be turned The steering gear for the automobile includes a cross bar 18 connected with the lever arms 19 leading from the spindles for mounting the steering wheels 20 so that when the steering shaft 21 is moved, the two wheels will be turned together. A bearing plate 22 is connected with the axle 23 by means of clamp 24 and to this bearing plate there is connected by means of pins or bolts 25, an actuating arm or lever 26, the inner end portion being provided with a slot 27 and the outer portion 28 of which is hingedly mounted for vertical movement and provided with a slot 29. This slotted outer portion 28 extends above the cross rod 17 and the slot 29 receives a pin 30 extending upwardly from the cross rod 17 so that as the actuating lever 26 is swung upon the pivot pin 25, the rod 17 may be moved longitudinally to turn the lamp. A stem 31 extends through this slot 27 and is provided at its lower end with a clamp 32 which engages the cross bar 18 and serves to swing the lever arm when the steering gear is operated to turn the guiding wheels 20.

When in use, this lamp actuating mechanism is installed as shown in Figs. 1 and 2 with the bearings 13 connected with the spring and the bearing 22 connected with the axle 23. The stem 31 will be connected with the cross bar 18 and the device is then ready for use. The steering gear shown represents a conventional form of steering gear and any desired type could be used which includes a cross bar connecting the lever arms 19 of the axle spindles. By providing the pivotally mounted outer portions 28 for the actuating lever 26, the springs may have their usual motion to take up vibration in going over rough roads without the lamp actuating mechanism being injured. It should be further noted that due to this construction, this lamp actuating mechanism may be connected with cars already in use since the bearings 13 are adjustably connected with the springs and the slots 27 and 29 of such length that the cross bar 18 does not have to be a specified distance from the axle 23. Therefore the lamp actuating mechanism may be removed from one car and transferred to a second and further the lamp actuating mechanism may be kept in stock and applied to cars already in use as well as new cars.

What is claimed is:—

1. A dirigible lamp actuating mechanism including bearing brackets for connection with supporting springs, lamp brackets including standards extending through the bearing brackets, a cross rod, arms pivotally connected with the end portion of the cross rod and connected with the standards of the lamp brackets, a bearing for connection with an axle, a stem for connection with a cross bar forming a portion of a wheel steering gear, and an actuating lever pivotally connected with the bearing plate and having its rear end portion provided with a slot to slidably receive said stem and having its forward end portion pivotally mounted for vertical movement and slotted to receive a pin extending from the cross rod connecting the lamp brackets.

2. A dirigible lamp actuating mechanism including a bearing for connection with an axle, an actuating lever pivotally connected with the bearing and having its rear end portion slotted longitudinally and having its forward end portion pivotally mounted and longitudinally slotted, a stem slidably mounted in the slotted rear end portion of the actuating lever, a cross rod including a pin slidably mounted in the slotted forward portion of the actuating lever, bearing brackets for connection with the springs of a vehicle, lamp brackets including standards rotatably mounted in the bearing brackets, and arms pivotally connected with the cross rod and rigidly connected with the standards.

3. A dirigible lamp actuating mechanism including an actuating lever having its end portions provided with longitudinally extending slots, means to pivotally connect the actuating lever with the axle of a vehicle, a stem slidably and pivotally mounted in the slot formed in the rear end portion of the actuating lever, a cross rod including a pin slidably and pivotally mounted in the slot formed in the forward end portion of the actuating lever, rotatably mounted lamp brackets including standards, and arms pivotally connected with the cross rod and rigidly engaging said standards for rotating the lamp brackets when the cross rod is moved longitudinally.

4. A dirigible lamp actuating mechanism including a lamp turning rod having a pin extending therefrom, a steering rod also having a pin extending therefrom, and a horizontally arranged actuating lever pivotally mounted upon the front axle having a slot in its front end engaging the pin on the lamp turning rod, and a slot in its rear end engaging the pin on the steering rod.

In testimony whereof I affix my signature in presence of two witnesses.

HARRY A. BOSSERT.

Witnesses:
G. A. STEVENS,
D. RUPP.